US006459497B1

United States Patent
Kashiwazaki

(10) Patent No.: US 6,459,497 B1
(45) Date of Patent: *Oct. 1, 2002

(54) METHOD AND APPARATUS FOR DELETING REGISTERED DATA BASED ON DATE AND TIME OF THE LAST USE

(75) Inventor: Masami Kashiwazaki, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/574,925

(22) Filed: Dec. 19, 1995

(30) Foreign Application Priority Data

Dec. 21, 1994 (JP) .............................. 6-318056

(51) Int. Cl.[7] .............................................. G06F 15/00
(52) U.S. Cl. ..................................... 358/1.15; 358/1.14
(58) Field of Search ................................ 395/101, 109, 395/112, 113, 114, 117, 511, 526, 329, 200, 200.01, 200.02, 200.03, 200.4, 200.5, 200.44, 200.15, 853, 864, 570, 200.51; 358/230, 405, 406, 437, 443, 448; 364/134

(56) References Cited

U.S. PATENT DOCUMENTS

| | | | | |
|---|---|---|---|---|
| 5,050,098 A | * | 9/1991 | Brown, III et al. | 364/519 |
| 5,075,874 A | * | 12/1991 | Steeves et al. | 392/112 |
| 5,228,118 A | * | 7/1993 | Sasaki et al. | 395/112 |
| 5,239,627 A | * | 8/1993 | Beck et al. | 395/275 |
| 5,268,993 A | * | 12/1993 | Ikenoue et al. | 395/114 |
| 5,303,336 A | * | 4/1994 | Kageyama et al. | 395/114 |
| 5,392,419 A | * | 2/1995 | Walton | 395/800 |
| 5,467,434 A | * | 11/1995 | Hower, Jr. et al. | 395/114 |
| 5,469,373 A | * | 11/1995 | Kasiwazaki et al. | 364/550 |
| 5,507,003 A | * | 4/1996 | Pipkins | 395/851 |
| 5,511,149 A | * | 4/1996 | Hayano | 395/112 |
| 5,559,933 A | * | 9/1996 | Boswell | 358/1.15 |
| 5,560,026 A | * | 9/1996 | Manthuruthil et al. | 345/433 |
| 5,574,887 A | * | 11/1996 | Fitch | 395/800 |
| 5,651,114 A | * | 7/1997 | Davidson, Jr. | 395/200.02 |
| 5,706,412 A | * | 1/1998 | Kojo | 358/1.14 |

FOREIGN PATENT DOCUMENTS

EP 0575168 A1 * 12/1993 ............ G06F/15/00

* cited by examiner

*Primary Examiner*—Gabriel Garcia
(74) *Attorney, Agent, or Firm*—Fitzpatrick, Cella, Harper & Scinto

(57) ABSTRACT

A data processing system in which a host computer and a printer are connected via a bidirectional interface, for flexible deletion of registered data from the host computer side. In the system, data is registered with additional function into the printer by an emulation function, from the host computer. The registered data is deleted based on an emulation command instructing deletion of the data, from the host computer. At this time, the emulation command includes flexible deletion condition(s) considering the additional information.

36 Claims, 9 Drawing Sheets

FIG. 8

| 1 | ID | | | | | | | |
|---|---|---|---|---|---|---|---|---|
| 2 | EMULATION ID | | | | | | | |
| 3 | SIZE | | | | | | | |
| 4 | NUMBER OF USE | | | | | | | |
| 5 | REGISTERED DATE & TIME | | | | | | | |
| 6 | DATE & TIME OF LAST USE | | | | | | | |
| 7 | AUTOMATIC DELETION DATE & TIME | | | | | | | |

| UNUSED MEMORY AREA | 100 / 500 KB |
|---|---|

METHOD AND APPARATUS FOR DELETING REGISTERED DATA BASED ON DATE AND TIME OF THE LAST USE

BACKGROUND OF THE INVENTION

This invention relates to a data processing apparatus and method and system and, more particularly to a data processing apparatus and method and system connected to an external device via a bidirectional interface.

Conventionally, an output device such as a printer which is connected to a host computer via a bidirectional interface has at least one or more emulation functions (e.g., LIPS, CaPSL, PCL and PostScript). Generally, as commands for these emulation functions, various registration commands are known. The registration command is used for registering information on font-pattern, macro-pattern, overlay-pattern, symbol set, fill-pattern and the like (hereinafter referred to as "registration matter(s)"), by transferring the informations from a host computer to an output device and storing a memory in the output device so that the registered matters can be used similar to other matters prestored in the output device.

Once the various registration matters are transferred from the host computer and registered in the output device by the registration command, the registered contents (hereinafter referred to as "registered matters") can be repeatedly used at the output device. Accordingly, at the host computer, it is not necessary to send the registration command every time the registered matter is required. This reduces the amount of data-transfer from the host computer and improves printing speed. Further, even information not stored in the output device can be freely defined and/or registered by an operator from the host computer side.

Since the various registration matters, to be registered by the registration command from the host computer, are registered by using the memory of the output device, in a case where the registered matter becomes unnecessary or a large amount of information is registered, the already-registered matter(s) should be deleted to make available memory space.

In the conventional art, to delete the various registered matters from the output device, the following methods are employed:

(1) Registration labels such as "Permanent" or "Temporary" are given to respective registration matters, and upon initialization for emulation execution or completion of emulation job, the registered matters are deleted in accordance with the given label. More specifically, the host computer issues a reset command or the like so as to delete the registered matters having the same label at once.

(2) Upon registration of information, an ID number is given to the information, and later deletion of the registered matter is executed by designating the ID number with a registered-matter deletion command. Note that ID numbers are managed by the host computer from the registration time. Otherwise, the ID numbers are managed by the output device, and they can be obtained by referring to the output device from the host computer, via the bidirectional interface, for various registered matters.

However, such methods for deleting registered matters pose the following problems.

Generally, as registered matter is frequently used at the output device, the registered matter is important information and therefore it is preferable to hold the information. However, the conventional output devices execute deletion of registered matters regardless of information on the number of times of actual use, registered date and time, date and time of the last use. Accordingly, the conventional output devices cannot deal with a case where deletion should be made in accordance with registered date and time or date and time of the last use.

Further, in a case where a size of memory space to be released by deletion should be designated, prior to issuance of a deletion command from the host computer, the output device must inform the host computer of the ID numbers and stored data amounts of the respective registered matters. Accordingly, the host computer side must determine combination(s) of registered informations to be deleted, based on the stored data amounts of the respective registered matters before it issues a deletion command. This imposes a considerably large amount of load upon the host computer side.

Further, in a case where a size of available memory space of the output device should be designated before deletion, the output device must inform the host computer via the bidirectional interface of a current available memory size, the ID numbers of the registered matters and their stored data amounts, before the host computer issues a deletion command. Also, the host computer side must determine combination(s) of registered informations to be deleted, based on the stored data amounts of the respective registered matters before it issues a deletion command, and also this imposes a considerably large amount of load upon the host computer.

Further, the conventional output device cannot deal with a case where deletion from registered matter of the minimum number of time of use, or from registered matter of the oldest registration date and time, or from registered matter of the oldest date and time of last use, is desired.

Further, the conventional output device cannot deal with a case where automatic deletion after a predetermined time from registration, or automatic deletion of registered matter which has been used less number of times than a predetermined number of times in a predetermined time.

Further, the output device having a plurality of emulation functions cannot execute deletion by an emulation command of an emulation function different from an emulation function at registration time.

SUMMARY OF THE INVENTION

Accordingly, an object of the present invention is to provide a data processing apparatus and method and system which, upon execution of deletion of registered matter which has been registered from an external device, by an emulation function, selects registered matter that meets a designated deletion condition and deletes the selected information.

According to the present invention, the foregoing object is attained by providing the procedure in FIG. 7, however, difference is that when a predetermined period (designated by the registered-matter automatic deletion time designation command) has elapsed since a command instructing deletion (registered-matter automatic deletion control command) was received, actual deletion processing at step S72 and the subsequent steps is started. Various settings can be made, as the condition(s) of deletion at step S75, by the following emulation commands used upon registered-matter automatic deletion:

5.1 Registered-matter automatic-deletion execution time designation command

ESC*d#T (#=registered-matter automatic deletion execution time;

Ex.: deleted after one day, 18 hours and 24 minutes has passed→01:18:24)

5.2 Registered-matter automatic deletion number-of-use designation command

ESC*d#H (#=number of use: registered matter(s) having this value or less is deleted)

5.3 Registered-matter automatic deletion control command

ESC*d#A (#=0: not perform automatic deletion
1: at a time where a predetermined period has passed from registration, automatically delete registered matter(s) having number of use(s) of designated value or less
2: automatically delete registered matter(s) a predetermined period has passed from the last use
11, 12; automatically delete registered matter(s) registered by an emulation command the same as that used in registration of registered matters deleted with #=1 and 2)

Note that automatic deletion date and time can be designated by the above-described registered-matter automatic deletion date&time designation command 1.2.

Further, automatic deletion designation by these registered-matter automatic deletion designation commands is normally made upon registration, however, new automatic deletion setting can be made by designating the ID number of a desired registered matter by the fill-pattern ID-number designation command 1.1 at arbitrary timing and designating any of the registered-matter automatic deletion designation commands.

As described above, upon execution of deletion a data processing apparatus having at least one emulation function, comprising:

communication means for bidirectional interfacing with an external device; and control means for registering data based on an instruction transmitted from the external device, and deleting the registered data based on an instruction transmitted from the external device.

In accordance with the present invention as described above, deletion can be made from the external device, based on information on the number of times of actual use, registered date and time, date and time of the last use, and the like, thus improving operability.

It is another object of the present invention to provide a data processing apparatus and method and system which designates a size of memory space to be released by deletion, prior to execution of deletion.

According to the present invention, the foregoing object is attained by providing the data processing apparatus according to claim 8, wherein if a size of memory space to be released is designated by the emulation command, the control means deletes the data by referring to the data size information so that memory space for the designated memory space size can be released.

In accordance with the present invention as described above, necessity for calculation of a size of memory space to be released by deletion at the external device can be omitted, thus the load at the external device can be reduced.

It is another object of the present invention to provide a data processing apparatus and method and system which designates a size of memory space to be available after deletion, prior to execution of deletion.

According to the present invention, the foregoing object is attained by providing the data processing apparatus according to claim 8, wherein if a size of memory space to be available is designated by the emulation command, the control means deletes the data by referring to the data size information so that memory space for the designated memory space size can be released.

In accordance with the present invention as described above, necessity for calculation of a size of memory space to be available after deletion at the external device can be omitted, thus the load at the external device can be reduced.

It is another object of the present invention to provide a data processing apparatus and method and system which sequentially deletes registered matters based on predetermined registration information.

According to the present invention, the foregoing object is attained by providing the data processing apparatus according to claim 3, wherein the additional information includes information on a number of use of the data, and wherein if deletion based on the number of use information is instructed by the emulation command, the control means deletes the data based on the number of use information.

Further, the foregoing object is attained by providing the data processing apparatus according to claim 3, wherein the additional information includes information on registered date and time of the data, and wherein if deletion based on the registered date and time information is instructed by the emulation command, the control means deletes the data based on the registered date and time information.

Further, the foregoing object is attained by providing the data processing apparatus according to claim 3, wherein the additional information includes information on date and time of last use of the data, and wherein if deletion based on the last use date and time information is instructed by the emulation command, the control means deletes the data based on the last use date and time information.

In accordance with the present invention as described above, the registered matters can be deleted, from registered matter of the minimum number of times of use, or from registered matter of the oldest registration date and time, or from registered matter of the oldest date and time of last use, thus operability can be improved.

It is another object of the present invention to provide a data processing apparatus and method and system which executes automatic deletion of registered matters based on predetermined registration information.

According to the present invention, the foregoing object is attained by providing the data processing apparatus according to claim 3, wherein if automatic deletion is instructed by the emulation command, the control means automatically deletes the data by referring to the additional information.

In accordance with the present invention as described above, automatic deletion after a predetermined period from registration or automatic deletion in a case where the number of times of use is less than a predetermined number can be made, thus operability can be improved.

It is another object of the present invention to provide a data processing apparatus an method and system which can delete registered matter(s) registered by an emulation command different from an emulation command used upon registration.

According to the present invention, the foregoing object is attained by providing the data processing apparatus according to claim 3, wherein the additional information includes specifying information specifying a name of an emulation function used upon registration, and wherein if deletion based on the emulation function name is instructed by an emulation command, the control means deletes the data based on the emulation function name.

In accordance with the present invention as described above, registered matters registered with a plurality of emulation commands can be deleted at once by issuing a deletion command, thus operability can be improved, and process speed can be increased.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is an example of a display image for registration-matter selection.

DETAILED DESCRIPTION OF THE PREFERRED EMBODIMENTS

Preferred embodiments of the present invention will now be described in detail in accordance with the accompanying drawings.

First Embodiment

<Laser-Beam Printer>

The construction of a laser-beam printer (LBP) to which an embodiment of the present invention is applied will be described with reference to FIG. 1.

Figure 1:
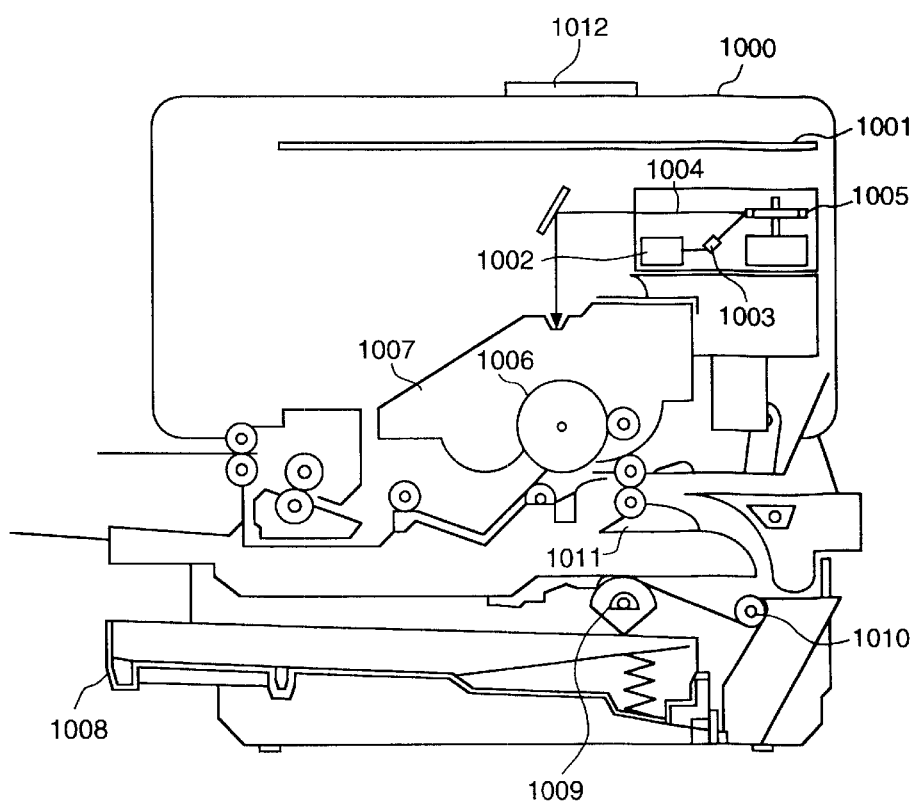
FIG. 1 is a cross sectional view of an laser-beam printer (LBP) main body to which an embodiment according to the present invention is applied.

FIG. 1 is a cross-sectional view of the construction of a laser-beam printer as an output device to which an embodiment of the present invention can be applied.

In FIG. 1, reference numeral 1000 denotes an LBP main body which inputs various print information (character codes, figure information etc.) and various registration information (font-pattern, macro-pattern, overlay-pattern, symbol set, fill-pattern information etc.), supplied from a host computer and stores the information, generates character patterns, figure patterns, form patterns corresponding to the stored information, and forms images on recording sheets as recording media.

Numeral 1012 denotes an operation panel on which switches and LED display devices for operation are arranged; 1001, a printer-control unit for controlling the overall LBP main body 1000 and interpreting the various registration information supplied from host computer. The printer-control unit 1001 mainly converts character information and figure information to corresponding patterned video signals and outputs the signals to the laser driver 1002.

The laser driver 1002, which is a circuit for driving a semiconductor laser 1003, turns on/off laser light 1004 to be emitted from the semiconductor laser 1003 in accordance with input video signals. The laser light 1004 is swayed in right and left directions and scan-exposed on an electrostatic drum 1006. Then, electrostatic latent images of the character patterns and figure patterns are formed on the electrostatic drum 1006. The latent images are developed by a developing unit 7 provided around the electrostatic drum 1006 and transferred onto recording sheets. The recording sheets are cut sheets contained in a paper cassette 1008 attached to the LBP 1000. The recording sheets are sequentially fed into the LBP 1000 by a paper-feed roller 1009 and convey rollers 1010 and 1011, to be provided to the electrostatic drum 1006. The LBP main body 1000 has at least one card slot (not shown) for connecting an option font card and control card (emulation card) of a different language system in addition to the installed font.

<<Printer-Control System>>

Figure 2:
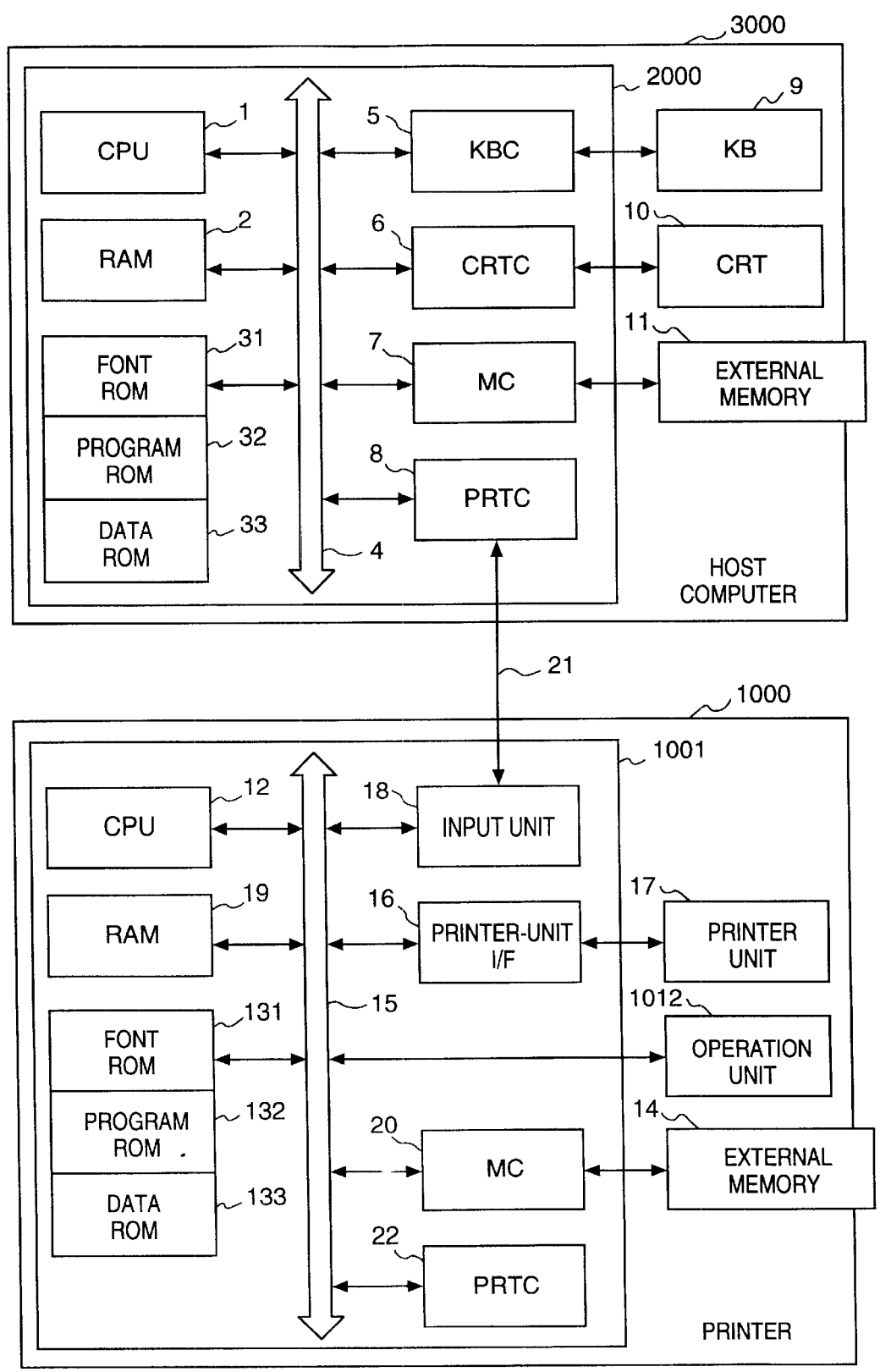
FIG. 2 is a block diagram showing the configuration of a printer-control system according to the embodiment.

FIG. 2 is a block diagram showing the construction of a printer-control system according to the present embodiment. Note that an explanation will be made using the laser-beam printer in FIG. 1 as an example. It goes without saying that the present invention is applicable to a system comprising a single device or a plurality of devices, or a system where processing is made via a network such as a LAN.

In FIG. 2, numeral 3000 denotes a host computer; 1, a CPU which executes processing of documents including figures, images, characters, tables (including spreadsheet) etc., based on a document-processing program and the like stored in a program ROM 32, and controls the respective devices connected to the system bus 4. Control programs for the CPU 1 and the like are stored in the program ROM 32; font data and the like used in the document processing are stored in a font ROM 31; and various data used in the document processing are stored in a data ROM 33. Numeral 2 denotes a RAM used as a main memory and a work area for the CPU 1; 5, a keyboard controller (KBC) which controls key-inputs from a keyboard (KB) 9 and a pointing device (not shown); 6, a CRT controller which controls display on a CRT display (CRT) 10; 7, a memory controller (MC) which controls access to a hard disk (HD) containing a boot program, various application programs, font data, a user files, editing files and the like and an external memory 11 comprising a floppy disk (FD) or the like; and 8, a printer controller (PRTC) connected to the printer 1000 via a bidirectional interface 21, which executes communication-control processing between the printer 1000.

Note that the CPU 1 executes processing for developing (rasterizing) outline font to a display information RAM set on the RAM 2, thus enables so-called WYSIWYG (What You See Is What You Get) on the CRT 10. Further, on the CRT 10, the CPU 1 opens various registered windows based on commands designated with a mouse cursor (not shown) or the like, to execute various data processings.

Figure 5:
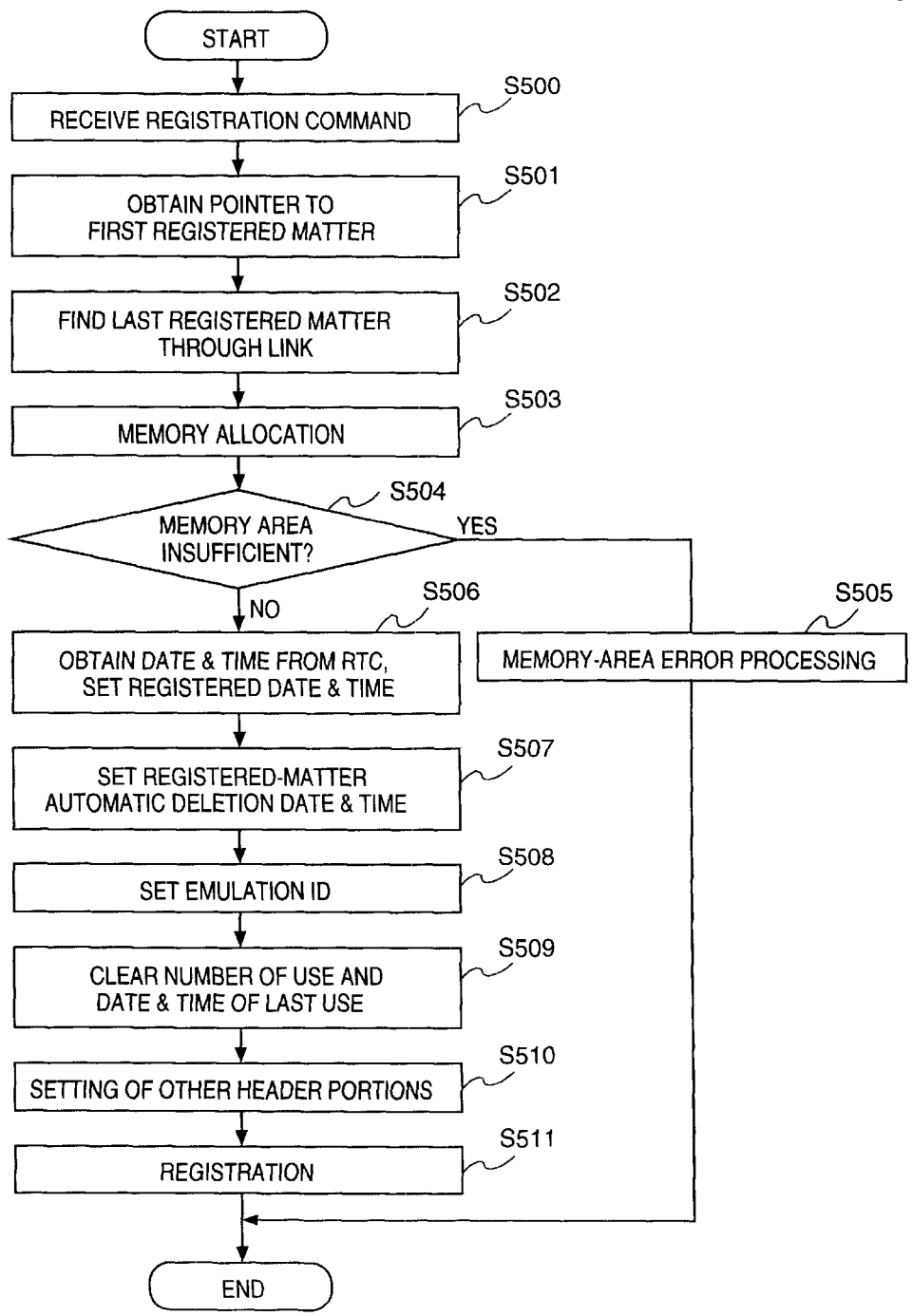
FIG. 5 is a flowchart showing an algorithm of fill-pattern registration processing according to the embodiment.
Figure 6:
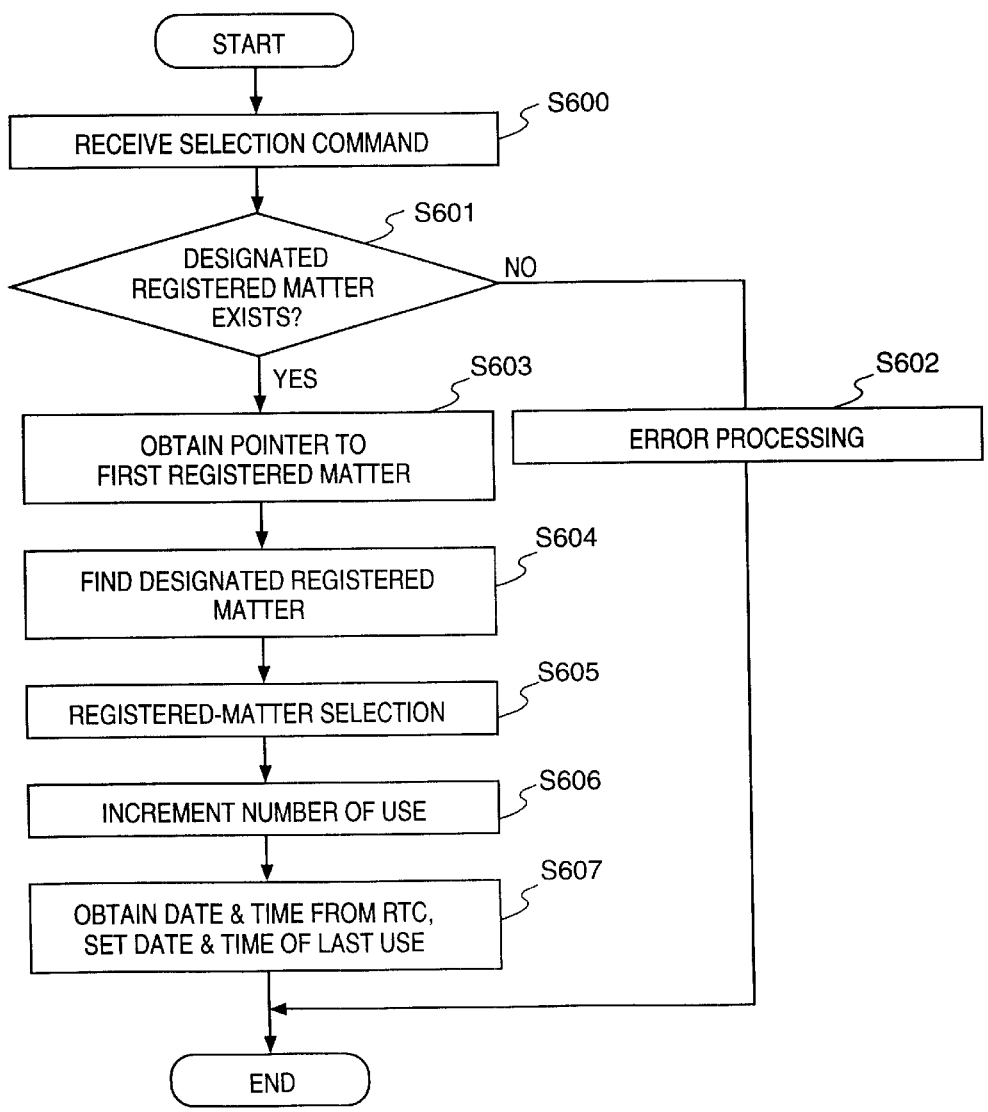
FIG. 6 is a flowchart showing an algorithm of fill-pattern selection processing according to the embodiment.
Figure 7:
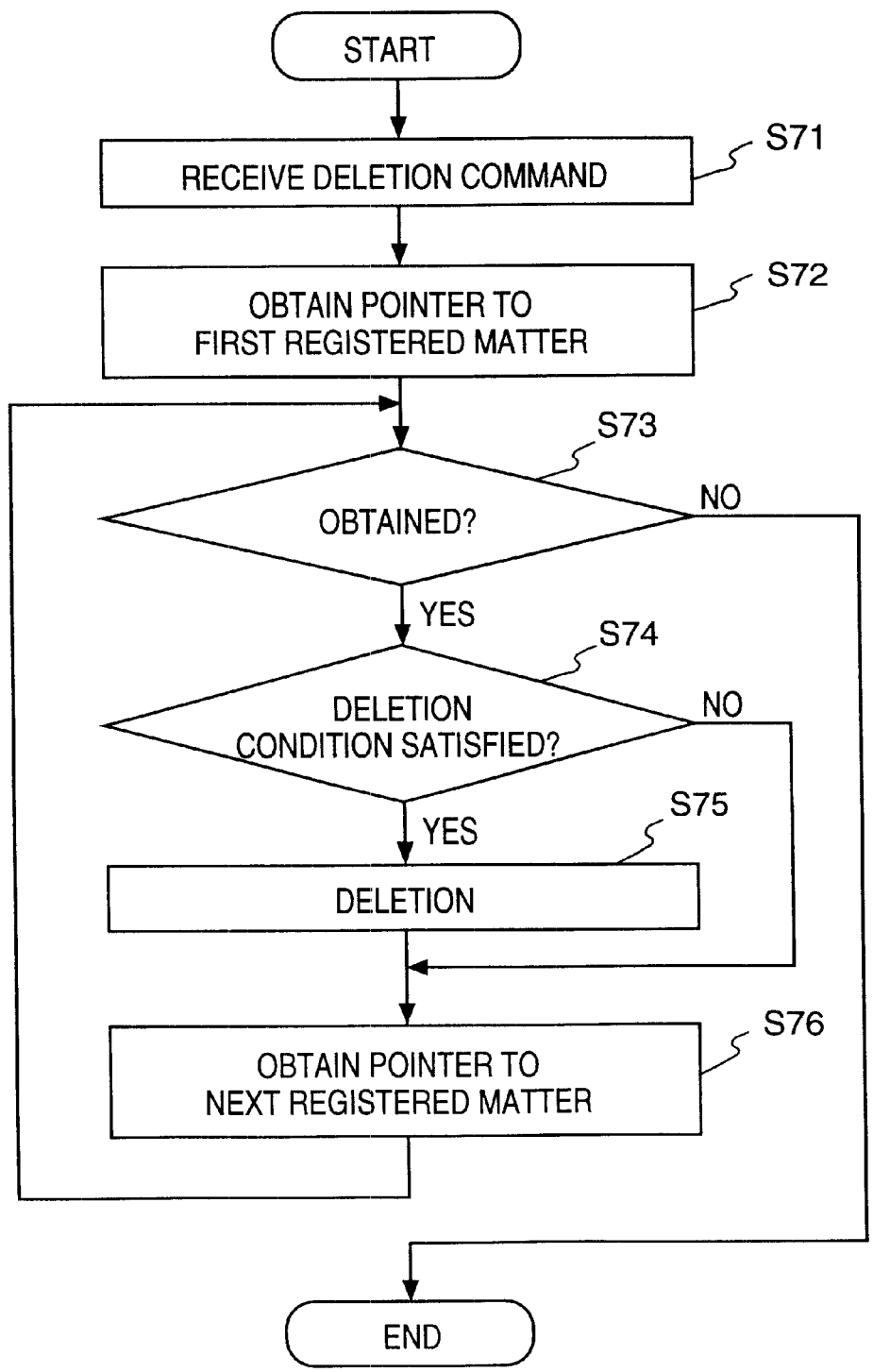
FIG. 7 is a flowchart showing an algorithm of registered-matter deletion processing according to the embodiment.

In the printer 1000, numeral 12 denotes a printer CPU, which controls access to devices connected to a system bus 15 based on control programs stored in a program ROM 132 or control programs stored in an external memory 14, and outputs image signals as output information to a printer unit (printer engine) 17. The program ROM 132 contains the control programs including a control program as shown in the flowcharts of FIGS. 5 to 7 to be described later; a font ROM 131, font data and the like used upon generating the output information; and a data ROM 133, information used on the host computer 3000 if the printer lacks the external memory 14 such as a hard disk. The CPU 12 enables communication processing between the host computer 3000 via an input unit 18 and is capable of informing the host computer 3000 of e.g., information within the printer 1000.

Numeral 19 denotes a RAM used as a main memory and a work area for the CPU 12. The RAM 19 has a capacity which can be increased by an optional RAM to be connected to an expanded port. Note that the RAM 19 is used as an output-information developing area, an environment data storage area, a storage area for various registered matters and the like. A memory controller (MC) 20 controls access from the CPU 12 to the above-mentioned external memory 14 comprising a hard disk (HD) or an IC card. Note that the external memory 14 is connected as an option memory in write-enable otherwise write-disable status. In the write-enable status, the various registered matters, emulation programs and the like can be stored there. On the other hand, if in the write-disable status, installed font, option card font, an emulation card program of different language system, macro pattern can be stored. The external memory 14 can be a plurality of memories.

Numeral 22 denotes a real-time clock (RTC) which controls data and time at the printer-control unit 1001.

The above-mentioned operation panel 1012 has the switches and LED devices for operating the printer 1000. It can be arranged that a non-volatile RAM (NVRAM) is provided so as to store printer mode setting information and the like at the operation panel 1012.

<<Processing at Printer-Control Unit>>

Figure 3:
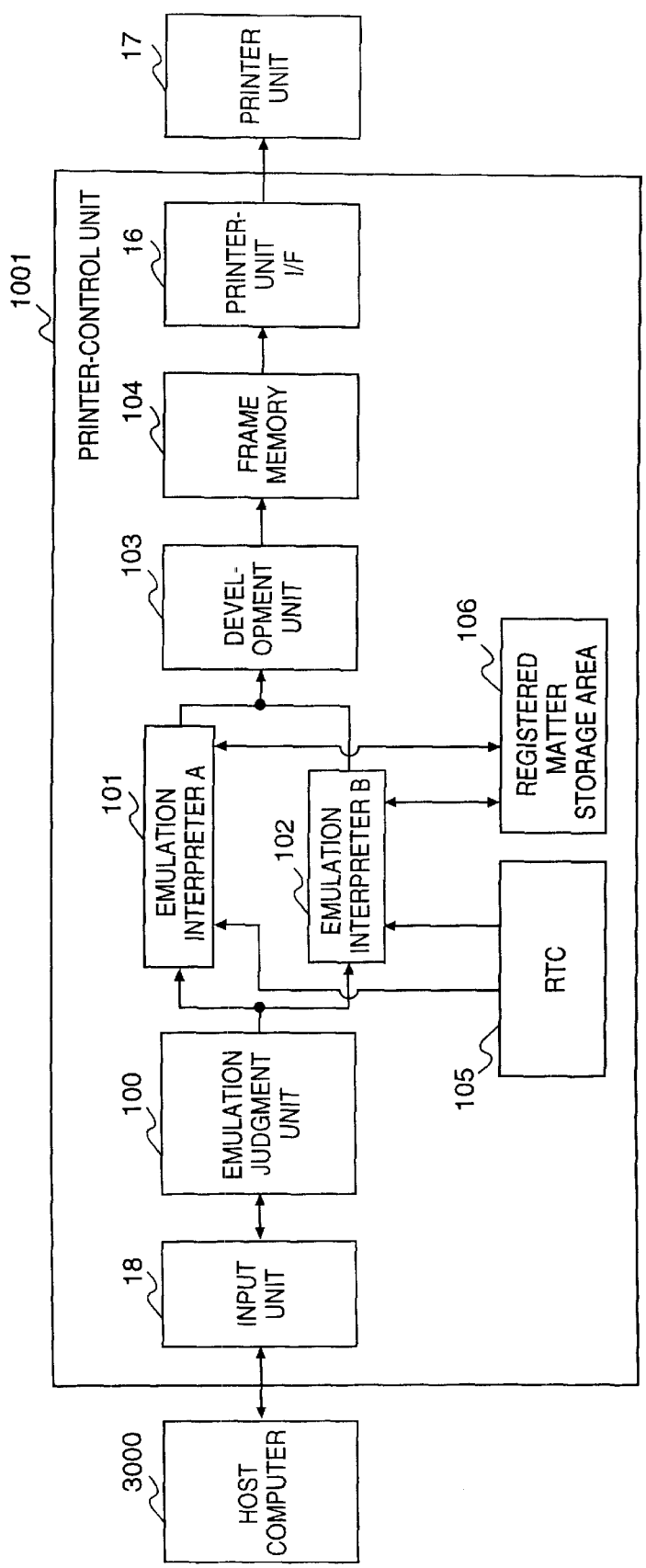
FIG. 3 is a block diagram showing the construction of a printer-control unit according to the embodiment.

FIG. 3 is a functional block diagram showing the printer-control unit 1001 according to the present embodiment. In the FIG. 3, numeral 3000 denotes the host computer; 18, the input unit; 100, an emulation judgment unit; 101 and 102, emulation interpreters, respectively corresponding to two types of emulation functions; 103, a development unit; 104, a frame memory; 16, a printer-unit interface; 17, the printer unit; 105, a real-time clock (RTC); and 106, a registered-matter storage area.

Data transferred from the host computer 3000 is temporarily stored into the input unit 18. When the amount of stored data reaches a predetermined standard value or a predetermined period has elapsed from time at which the last data was stored, the data stored in the input unit 18 is sent to the emulation judgment unit 100. The emulation judgment unit 100 judges one of the emulation functions corresponding to a control command in the data, and forwards the data to the corresponding one of the emulation interpreters 101 and 102.

The emulation interpreter 101 or 102 interprets the input data. If the input data includes various registration commands, the emulation interpreter 101 or 102 obtains data on current date and time from the RTC 105, and performs processing for registering various informations into the registered-matter storage area 106. Note that this registration processing will be described later.

The emulation interpreter 101 or 102 refers to the various registered matters stored in the registered-matter storage area 106 and outputs the data, generated by interpreting the input data, to the development unit 103. At the development unit 103, an image is generated in a format of, e.g., one-page bitmap image, and outputted to the frame memory 104. The printer-unit interface 16 records an image on a recording medium such as a recording sheet by performing laser-beam on/off control with respect to the printer unit 17, in accordance with the content in the frame memory 104.

Note that a temporary storage area for image data generated by the emulation interpreters 101 and 102, the registered-matter storage area 106 and the frame memory 104 are provided on the RAM 19 in FIG. 2, however, they may be respectively ensured as independent memories. Otherwise, another common memory area may be prepared and shared as these storage areas. For example, the registered-matter storage area 106 may exists within the external memory 14.

<<Registration and Deletion by Emulation Interpreter>>

Next, registration, selection and deletion of various registration matters by the emulation interpreters 101 and 102 in FIG. 3 will be described in detail. First, the registration processing will be described with an example where a user-defined fill-pattern is registered.

(1) Registration of Fill-Pattern

Upon registration of a fill-pattern, first, an ID number of a fill-pattern to be registered is designated. At this time, date and time of automatic deletion of the registration pattern is set in case of necessity. Then, actual registration is performed by a fill-pattern registration command.

Figure 4:
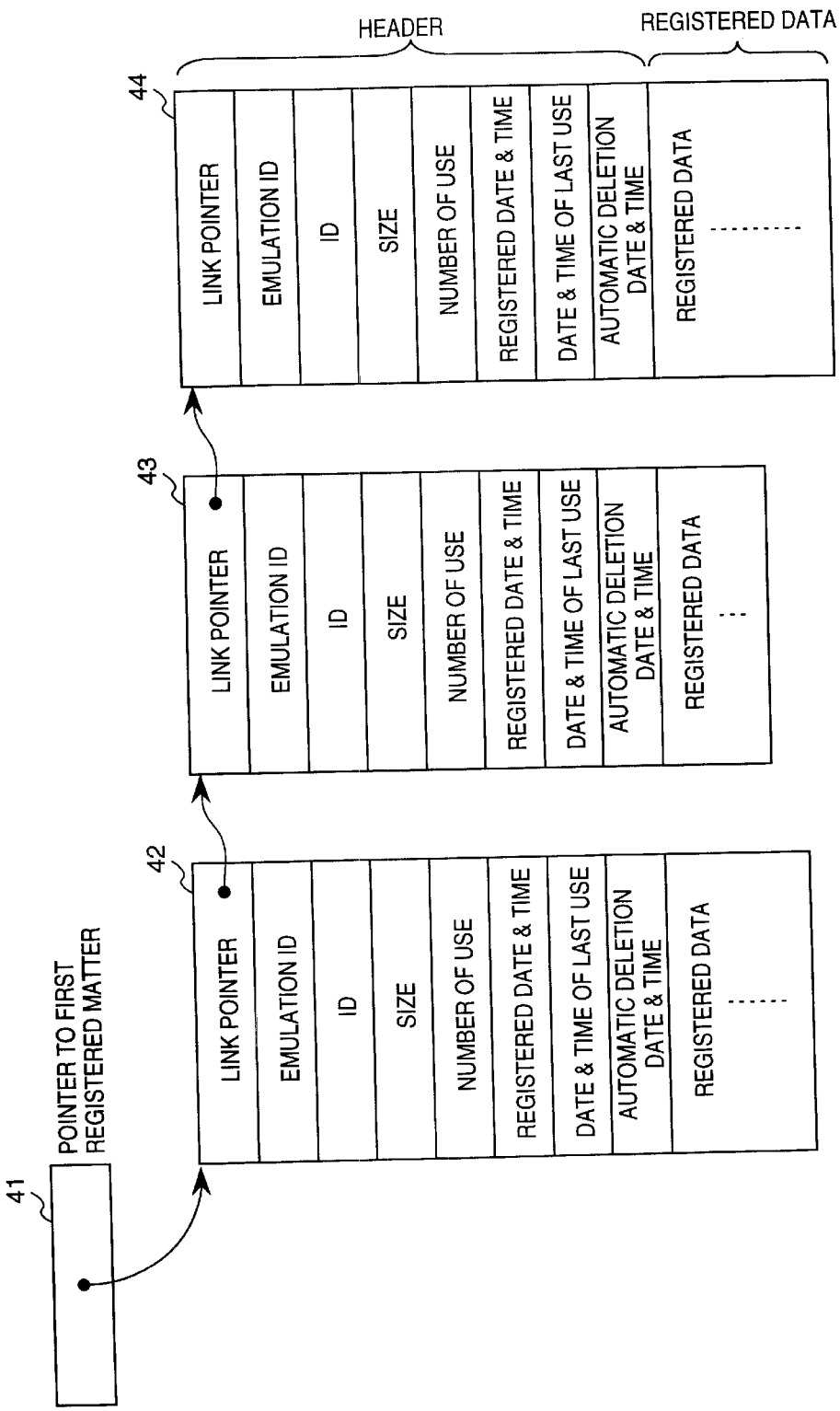
FIG. 4 is an example of registered matters stored in registered-matter storage areas according to the embodiment.

Next, the registration processing in accordance with a fill-pattern registration command will be described in detail with reference to FIG. 5. FIG. 5 is a flowchart showing an algorithm of the registration processing by the fill-pattern registration command. A program for realizing the algorithm is stored in the program ROM 132. Further, FIG. 4 shows an example of three registered matters generated and stored at the registered-matter storage area 106 in FIG. 3. The registration matters in FIG. 4 respectively divide into a registration data portion and a header portion. The respective registered matters have addresses linked together by link pointers 41 to 44. For example, the last link pointer 44 of the address chain has a value "0" indicating that there is no subsequent registration matter. Hereinafter, each item at the header portion is given with quotation marks (" ").

In FIG. 5, a fill-pattern registration command is received at step S500, and the pointer 44 to the first fill-pattern is obtained at step S501. Next, the link pointers 42, 43 and 44 are sequentially checked to find the last registered matter at step S502, and a memory area necessary for registration is ensured in accordance with the number of registration pattern-data bytes, to be described later, of the fill-pattern registration command, at step S503. If the necessary memory area is insufficient, the process proceeds to step S505, at which memory-area error processing is performed, and the process ends. Then, the start address at the allocated memory area is set at the link pointer 44 of registration data immediately prior to the current registration data, and the link pointer value of the allocated memory area is set to "0".

On the other hand, if the necessary memory area has been ensured, the ensured memory capacity is set to "size" item of the header portion of the current data, and the process proceeds to step S506, at which current date and time is obtained from the RTC 105 and "registration date&time" is set at the header portion. Then at step S507, if automatic deletion date&time is designated by an emulation command, the "automatic deletion date&time" is also set. At step S508, an "emulation ID" is set. Next, at step S509, "number of use" and "date&time of last use" are cleared (initialized). At step S510, setting of other header portions are made. At step S511, actual fill-pattern registration processing is executed, and the process ends.

The following is an example of the emulation commands used in fill-pattern registration:

1.1 Fill-pattern ID-number designation command
ESC*c#G (#=fill-pattern ID number)
1.2 Registered-matter automatic deletion date&time designation command
ESC*d#D (#=registered-matter automatic deletion date&time ex. 6:24 pm May 12, 1994→199405121824)
1.3 Fill-pattern registration command
ESC*c#W[pattern data] (#=the number of pattern data bytes)

Note that the storage method for the respective registered matters is not limited to the format example as shown in FIG. 4, but it may be a construction where the header portion and the registered-data portion, and a pointer relating the respective portions with each other is provided.

(2) Fill-Pattern Selection

Next, an example of selecting a fill-pattern will be described.

Upon selection of a fill-pattern, an ID number of a fill-pattern as the object is designated at the host computer 3000, and the fill-pattern (#=4) is designated by a fill-pattern selection command to be described later, thus an arbitrary fill-pattern is selected.

The processing in a case where an operator at the host computer 3000 selects an arbitrary fill-pattern will be described with reference to FIG. 8 which is an example of an image displayed on the CRT 10. The table in FIG. 8 is notification to the operator, showing registered matters in the registered-matter storage area 106 in the printer 1000, resulted from accessing by the CPU 1 of the host computer 3000 to the storage area 106. The operator refers to the table and grasps the memory contents of the printer 1000, thus can select a fill-pattern to be used, otherwise, determine a fill-pattern as the object of deletion upon issuance of a deletion command. In the display of FIG. 8, the displayed items can be arranged in ascending order by designating the item numbers from the keyboard 9. Note that the table in FIG. 8 may be periodically obtained at predetermined timing via the bidirectional interface 21, otherwise may be obtained at timing in accordance with instruction from the operator.

Next, the selection processing in accordance with a fill-pattern selection command will be described in detail with reference to FIG. 6 which is a flowchart showing an algorithm for the selection processing. A control program for performing the algorithm is stored in the program ROM 132. Hereinafter, an example where the registered fill-pattern which is indicated by the link pointer 44 in FIG. 4 is selected will be described.

In FIG. 6, at step S600, a fill-pattern selection command is received, and at step S601, whether or not an ID number designated by a fill-pattern ID-number designation command exists is determined. That is, the item "ID" of the header portion is checked. If the fill-pattern of the ID number does not exist, the process proceeds to step S602 to perform error processing, and the process ends.

On the other hand, if the fill-pattern of the ID exists, the process proceeds to step S604, at which the first pointer 41 is obtained and the registered fill-pattern is found via the link pointers 42 to 44. At step S605, registered-matter selection processing is performed. Thereafter, the item "number of use" of the selected registered-matter is incremented at step S606, then a current date and time is obtained from the RTC to increment the item "date&time of last use" at step S607, and the process ends. Note that the retrieval at step S601 may be performed together with the retrieval at steps S603 and 604 as one retrieval process.

The followings are examples of the respective commands used upon the fill-pattern selection:

2.1 Fill-pattern ID-number designation command (same as 1.1)
ESC*c#G (#=fill-pattern ID number)
2.2 Fill-pattern selection command
ESC*v#T (#=0: installed solid-black pattern
1: installed solid-white pattern
2: installed shading pattern
3: installed cross-hatching pattern
4: fill-pattern)

(3) Fill-Pattern Deletion

Next, deletion of fill-pattern(s) will be described. In a case where only a registered fill-pattern is deleted, the following fill-pattern deletion command is used:

3.1 Fill-pattern deletion command
EXC*c#Q (#=0: delete all fill-patterns
1: delete all temporary fill-patterns
2: delete the last fill-pattern designated by the ID-number designation command)

For example, an ID number of a fill-pattern as the object of deletion is designated by the fill-pattern ID-number designation command (2.1), and thereafter, the fill-pattern deletion command is used with #=2. Thus the fill-pattern of designated ID is deleted.

As described above, upon deleting registered matter(s) in the printer 1000 by the host computer 3000, an arbitrary fill-pattern desired by the operator is designated by the fill-pattern deletion command and the deletion is executed. Thus, deletion of arbitrary registered matter from the host computer can be easily made, accordingly, the memory of the output device can be efficiently used.

(4) General Registered-Matter Deletion Command

In the above-described fill-pattern deletion (3), deletion is only directed to fill-pattern(s). Actually, deletion must be effective regarding font, macro-pattern etc. In this embodiment, when deletion is performed without defining the type of registered matter(s), a general registered-matter deletion command is used. As conditions of execution of registered-matter deletion by this command are a memory size to be released, a number of use, registered date and time, emulation type and the like can be designated. Accordingly, upon inputting of the general registered-matter deletion command, whether or not designated registered matter(s) can be deleted is determined by referring to the various information of the header portion(s) as shown in FIG. 4. Deletion is executed if it is determined that deletion is possible.

Next, the deletion of registered matter(s) without defining the type of registered matter(s) according to the present embodiment will be described in detail using the registered matters in FIG. 4. FIG. 7 is a flowchart showing an algorithm for the registered-matter deletion processing without defining registered-matter type. A program for performing the algorithm is stored in the program ROM 132.

In FIG. 7, at step S71, the printer 1000 receives a command instructing deletion (general registered-matter deletion command) from the host computer 3000. At this time, the printer 1000 also receives a released memory size designation command to be described later and a command for designating priorities of general registered-matter deletion, a number of use and a date&time. At step S72, the pointer 41 to reach the first registered-matter is obtained. If it is determined at step S73 that the pointer 41 has been obtained, the process proceeds to step S74. Note that if it is determined the pointer 41 has not been obtained, it is considered that the pointer chain has been checked through, i.e., all the registered-matters have been checked, or some error have occurred, the process ends.

At step S74, whether or not the registered-matter currently being referred to satisfies predetermined condition(s) of deletion is determined. If YES, deletion is performed at step S75, while if NO, the process proceeds to step S76. At step S76, the pointer of the next registered-matter is obtained, then the process returns to step S73 to repeat the above processing.

In this manner, registered matters which satisfy predetermined condition(s) are all deleted (S75). As the deletion condition(s) of the present embodiment, various settings desired by the operator can be made in accordance with the following emulation commands.

The followings are examples of the respective commands used upon the general registered-matter deletion:

4.1 Released memory size designation command
ESC*d#M (#=released memory size; unit: kilobyte)

4.2 A command for designating priorities of general registered-matter deletion, a number of use and a date&time
ESC*d#P
Priority designation (#=0, 1, 10 or 11 in general registered-matter deletion command 4.3):
(#=0: in ascending order of number of use
1: in serial order of registered date and time
2: in serial order of date and time of last use)
Number of use designation (#=2, or 12 in general registered-matter deletion command 4.3):
(#=number of use)
Date&time designation (#=3 to 6, or 13 to 16 in general registered-matter deletion command 4.3):
(#=deletion execution reference date&time)

4.3 General registered-matter deletion command
ESC*d#E (#=0: delete registered matter(s) for a memory size designated by released memory size designation command, following priority designated by priority designation command
1: delete registered matters following priority designated by priority designation command till a registered-matter storage area (free memory area) of a memory size designated by released memory size designation command is obtained.
2: delete all registered matters of number of use less than that designated by number of use registration command
3: delete all registered-matters of registered date and & time older than deletion execution reference date&time designated by date&time designation command
4: delete all registered matters of registered date and & time newer than deletion execution reference date&time designated by date&time designation command
5: delete all registered matters of date and time of last use older than deletion execution reference date&time designated by date&time designation command
6: delete all registered matters of date and time of last use newer than deletion execution reference date&time designated by date&time designation command
10–16: delete all registered matters registered by emulation command same as that of registered matters deleted in deletion when #=0 to 6)

For example, if "ESC*d50M (released memory size designation command 4.1)", "Esc*d2P(priority designation command 4.2)," and "ESC*d1E (general registered-matter deletion command 4.3)" are issued from the host computer 3000, registered matters in the registered-matter storage area 106 are sequentially deleted by the CPU 12 of the printer 1000 in ascending order of date and time of last use till a free memory of 50 KB is obtained.

As described above, upon execution of deletion of registered matter(s) in the printer 1000 by the host computer 3000, deletion can be made based on information on the number of actual use, registered date and time, date and time of last use etc.

Further, if a released memory size is designated by an emulation command from the host computer 3000, registered matter(s) to be deleted and the size of memory space of the printer 1000, to be obtained by deletion, are determined within the printer 1000, thus it is unnecessary to perform calculation by the host computer 3000 and load upon the host computer 3000 can be reduced.

Similarly, if a size of memory space of the printer 1000, to be available after deletion, is designated from an emulation command from the host computer 3000, load upon the host computer 3000 can be reduced.

Further, registered matters can be sequentially deleted in ascending order of number of use, serial order of registered date and time, in serial order of date and time of last use and the like.

Furthermore, in a case where the printer 1000 has a plurality of emulation command functions, deletion by an emulation command different from that upon registration is possible.

Accordingly, more flexible deletion of registered matter (s) is possible by issuance of emulation command from the host computer 3000.

(5) Registered-Matter Automatic Deletion Command

Next, automatic deletion of registered matter(s) will be described.

The automatic deletion of registered matter(s) is performed if a designated period has elapsed from registration time or from last use of registered matter(s), to automatically delete registered matter(s) which is/are the object(s) of deletion at the time. Note that a number of use and type of emulation can be designated as well as the above time period.

Even though the printer does not perform printing, once automatic deletion is designated, this processing is realized by comparing current date and time obtained from the RTC 22 with "registered date&time" and "date&time of use" of respective registered matters at a fixed periods to determine whether or not the registered matter is the object of deletion.

Further, in a case where "automatic deletion date&time" has been designated in advance by an emulation command upon registration time, registered matter(s) can be automatically deleted at the designated automatic deletion date and time, by comparing current date and time obtained from the RTC 22 with "automatic deletion date&time" of the respective registered matters.

The registered-matter automatic deletion processing is performed basically in accordance with of registered matter (s), registered from the host computer 3000 into the printer 1000, flexible automatic deletion, such as automatic deletion after a predetermined period from registration, and automatic deletion of registered matter(s) used less number of times than a predetermined number of use within a predetermined period, can be performed.

As described above, according to the present embodiment, upon deletion of registered matter in the printer 1000 by the host computer 3000, an arbitrary deletion method desired by an operator can be designated by an emulation command, thus deletion can be executed. That is, in this embodiment, the host computer 3000 can manage registered matter(s) stored in, e.g., the RAM 19 (registered-matter storage area 106) of the printer 1000. In other words, the host computer 3000 monitors a memory map of the RAM 19 of the printer 1000, which allows the operator to arbitrarily control the storage status of the RAM 19 of the printer 1000 on the host computer 3000 side.

Accordingly, registered matter(s) in the printer 1000 can be easily deleted from the host computer 3000, therefore the RAM 19 of the printer 1000 can be efficiently used.

Note that the present embodiment employs an LBP as a printer to which the present invention is applied, however, it is not pose any limitation upon the present invention. The present invention is applicable to printing devices according to other printing methods such as a wire-dot printer and an ink-jet printer.

Further, in the present embodiment, only registration and selection of a fill-pattern by emulation commands are explained, however, registration and selection of other information such as macro-patterns and font patterns can be made in a similar manner.

Note that the processing programs shown by the flowcharts of FIGS. 5 to 7 are stored in the program ROM 132 of the printer 1000, however, these program may be the program ROM 32 of the host computer 3000 and executed by the CPU 1. In addition, the processing programs may be stored into the program ROM 32 of the host computer 3000 and upon execution, loaded to the RAM 19 of the printer 1000, so that the CPU 12 can execute the programs.

Other Embodiment

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

For example, the external memory 14 of the printer 1000 can be a floppy disk, otherwise, the external memory 11 of the host computer 3000 can be a CD-ROM.

Figure 9A:
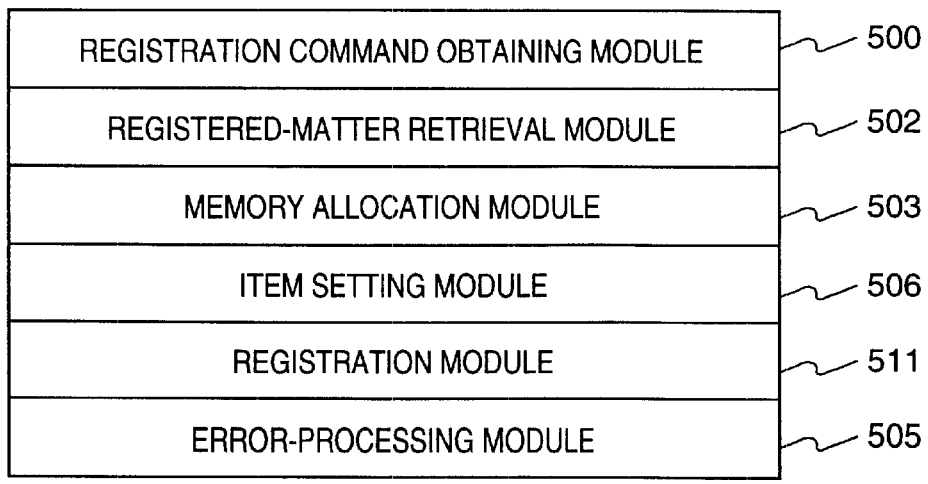
FIGS. 9A to 9C are explanatory views showing the structural feature of a program according to the present invention.
Figure 9B:
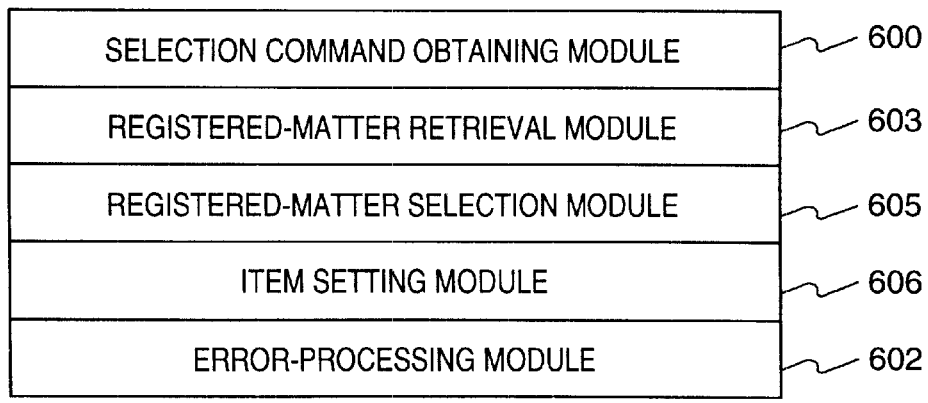
Figure 9C:
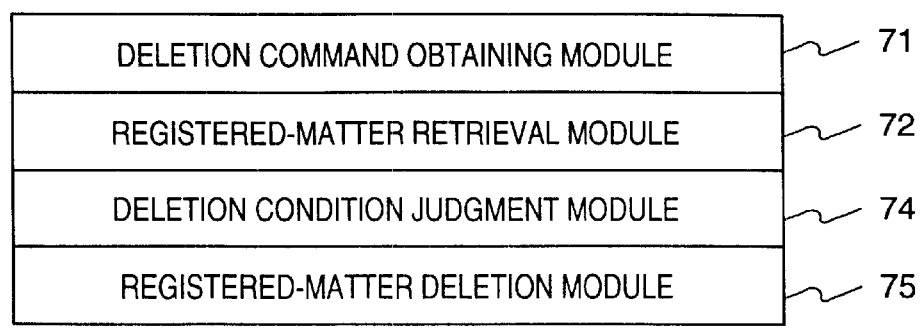

The structural feature is shown in FIGS. 9A to 9C in which the modules are respective steps in the flowcharts of FIGS. 5 to 9.

Furthermore, besides aforesaid functions according to the above embodiment are realized by executing the program codes which are read by the host computer 3000, the present invention includes a case where an OS or the like working on the host computer 3000 performs a part or entire processes in accordance with designations of the program codes and realizes functions according to the above embodiment.

The present invention can be applied to a system constituted by a plurality of devices (e.g., host computer, interface, reader, printer) or to an apparatus comprising a single device (e.g., copy machine, facsimile).

The present invention is not limited to the above embodiments and various changes and modifications can be made within the spirit and scope of the present invention. Therefore, to apprise the public of the scope of the present invention, the following claims are made.

What is claimed is:

1. A data processing apparatus having a plurality of interpreting functions which interpret input data, comprising:
    a communicator for communicating with an external device, and
    a controller for determining one of the plurality of interpreting functions corresponding to a data command and controlling registration of data based on a registration command transmitted from the external device and deletion of the registered data based on a deletion command transmitted from the external device,
    wherein said controller permits a second interpreting function to execute deletion of data registered by a registration command corresponding to a first interpreting function that is different from the second interpreting function, in response to a deletion command corresponding to the second interpreting function.

2. The data processing apparatus according to claim 1, further comprising a data holder for holding data registered by said controller,
    wherein said controller deletes the data held by said data holder.

3. The data processing apparatus according to claim 2, wherein the external device can refer to information on the data held by said data holder, by said communicator.

4. The data processing apparatus according to claim 3, wherein the external device issues the deletion command by referring to the information on the data held by said data holder.

5. The data processing apparatus according to claim 1, further comprising an image former for forming an image based on data registered by said controller.

6. The data processing apparatus according to claim 1, wherein the registered data comprises specifying information specifying a name of an interpreting function used upon registration, and
    wherein if deletion based on the interpreting function name is instructed by the deletion command, said controller deletes the data based on the interpreting function name.

7. The data processing apparatus according to claim 1, wherein the registered data comprises information on a size of the data, and
    wherein if deletion based on the data size information is instructed by the deletion command, said controller deletes the data based on the data size information.

8. The data processing apparatus according to claim 7, wherein if a size of memory space to be released is designated by the deletion command, said controller deletes the data by referring to the data size information so that memory space for the designated memory space size can be released.

9. The data processing apparatus according to claim 8, wherein if a size of memory space obtained by deletion is smaller than the memory space size designated by the deletion command, said controller informs the external device of insufficiency of obtained memory space.

10. The data processing apparatus according to claim 7, wherein if a size of memory space to be available is designated by the deletion command, said controller deletes the data by referring to the data size information so that memory space for the designated memory space size can be released.

11. The data processing apparatus according to claim 10, wherein if a size of memory space obtained by deletion is smaller than the memory space size designated by the deletion command, said controller informs the external device of insufficiency of obtained memory space.

12. The data processing apparatus according to claim 1, wherein the registered data comprises information on a number of times the data is used, and
wherein if deletion based on the information on the number of times the data is used is instructed by the deletion command, said controller deletes the data based on the information on the number of times the data is used.

13. The data processing apparatus according to claim 12, wherein if sequential deletion based on the information on the number of times the data is used is instructed by the deletion command, said controller deletes data in ascending or descending order of the number of times the data is used.

14. The data processing apparatus according to claim 1, wherein said controller informs the external device of information on deleted data by said communicator.

15. The data processing apparatus according to claim 1, wherein if there is no data to be deleted, said controller informs the external device of absence of deleted data.

16. The data processing apparatus according to claim 1, wherein the registered data is indicative of any one of a font pattern, an overlay pattern, a symbol set, and a fill-pattern.

17. The data processing apparatus according to claim 1, wherein the external device is a host computer, the data processing apparatus is a printer, and each interpreting function is an emulation function which emulates commands of a corresponding language.

18. A data processing method for a data processing apparatus, connected to an external device, having a plurality of interpreting functions which interpret input data, said method comprising the steps of:
determining one of the plurality of interpreting functions corresponding to a data command;
controlling registration of data based on a registration command corresponding to a first interpreting function transmitted from the external device; and
controlling deletion of the registered data based on a deletion command corresponding to a second interpreting function transmitted from the external device,
wherein the first interpreting function is different from the second interpreting function.

19. A storage medium storing a program for a data processing apparatus connected to an external device, the data processing apparatus having a plurality of interpreting functions which interpret input data, said program controlling the data processing apparatus to perform the steps of:
determining one of the plurality of interpreting functions corresponding to a data command;
controlling registration of data based on a registration command corresponding to a first interpreting function transmitted from the external device; and
controlling deletion of the registered data based on a deletion command corresponding to a second interpreting function transmitted from the external device,
wherein the first interpreting function is different from the second interpreting function.

20. A printing apparatus having a plurality of interpreting functions which interpret input data, comprising:
a communicator for communicating with an external device; and
a controller for determining one of the plurality of interpreting functions corresponding to a data command and controlling registration of data based on a registration command transmitted from the external device, and deletion of the registered data based on a deletion command transmitted from the external device,
wherein the registration command comprises data used for generating a print pattern and time information for designating a registered time of the registered data, and
wherein said controller selects registered data to be deleted based on a registered time designated by the time information and deletes selected registered data, in response to the deletion command.

21. The printing apparatus according to claim 20, wherein if sequential deletion is instructed by the deletion command, said controller deletes the registered data in a serial order of the registered time.

22. The printing apparatus according to claim 20, wherein if a reference time is designated by the deletion command, said controller deletes the registered data of a registered time older than the reference time.

23. The printing apparatus according to claim 20, wherein the registered data is indicative of any one of a font pattern, an overlay pattern, a symbol set, and a fill-pattern.

24. A control method for controlling a printing apparatus having a plurality of interpreting functions which interpret input data, comprising the steps of:
determining one of the plurality of interpreting functions corresponding to a data command; and
controlling registration of data based on a registration command transmitted from an external device, and deletion of the registered data based on a deletion command transmitted from the external device,
wherein the registration command comprises data used for generating a print pattern and time information for designating registered time of the registered data, and
wherein the step of controlling deletion of registered data is performed in response to the deletion command, and comprises the steps of:
selecting registered data to be deleted based on a registered time designated by the time information, and
deleting the registered data selected in the selecting step.

25. A storage medium storing a program for controlling a printing apparatus having a plurality of interpreting functions which interpret input data, said program controlling the printing apparatus to perform the steps of:
determining one of the plurality of interpreting functions corresponding to a data command; and
controlling registration of data based on a registration command transmitted from an external device, and deletion of the registered data based on a deletion command transmitted from the external device,
wherein the registration command comprises data used for generating a print pattern and time information for designating registered time of the registered data, and
wherein the step of controlling deletion of registered data is performed in response to the deletion command, and comprises the steps of:

selecting registered data to be deleted based on a registered time designated by the time information, and deleting the registered data selected in the selecting step.

26. A printing apparatus having a plurality of interpreting functions which interpret input data, comprising:

a communicator for determining one of the plurality of interpreting functions corresponding to a data command and communicating with an external device; and a controller for controlling registration of data based on a registration command transmitted from the external device, and deletion of the registered data based on a deletion command transmitted from the external device, wherein the registration command comprises data used for generating a print pattern and time information for designating a time of last use of the registered data, and wherein said controller selects registered data to be deleted based on the time of last use designated by the time information and deletes selected registered data in response to the deletion command.

27. The printing apparatus according to claim 26, wherein if sequential deletion is instructed by the deletion command, said controller deletes the registered data in a serial order of the time of last use.

28. The printing apparatus according to claim 26, wherein if a reference time is designated by the deletion command, said controller deletes the registered data of the time of last use that is older than the reference time.

29. The printing apparatus according to claim 26, wherein the registered data is indicative of any one of a font pattern, an overlay pattern, a symbol set, and a fill-pattern.

30. A control method for controlling a printing apparatus having a plurality of interpreting functions which interpret input data, comprising the steps of:

determining one of the plurality of interpreting functions corresponding to a data command, and controlling registration of data based on a registration command transmitted from an external device, and deletion of the registered data based on a deletion command transmitted from the external device, wherein the registration command comprises data used for generating a print pattern and time information for designating a time of last use of the registered data; and wherein the step of controlling deletion of the registered data is performed in response to the deletion command, and comprises the steps of:

selecting registered data to be deleted based on a time of last use designated by the time information, and deleting the registered data selected in the selecting step.

31. A storage medium storing a program for controlling a printing apparatus having a plurality of interpreting functions which interpret input data, said program controlling the printing apparatus to perform the steps of:

determining one of the plurality of interpreting functions corresponding to a data command, and controlling registration of data based on a registration command transmitted from an external device, and deletion of the registered data based on a deletion command transmitted from the external device, wherein the registration command comprises data used for generating a print pattern and time information for designating a time of last use of the registered data; and wherein the step of controlling deletion of the registered data is performed in response to the deletion command, and comprises the steps of:

selecting registered data to be deleted based on a time of last use designated by the time information, and deleting the registered data selected in the selecting step.

32. A printing apparatus having a plurality of interpreting functions corresponding to a data command, comprising:

a communicator for communicating with an external device; and a controller for determining one of the plurality of interpreting functions corresponding to a data command and controlling registration of data based on a registration command transmitted from the external device and deletion of the registered data based on a deletion command transmitted from the external device, wherein the registration command comprises data used for generating a print pattern and time information for designating a deletion time of the registered data, and wherein said controller deletes data registered by the registration command on the deletion time designated by the time information included in the registration command.

33. The printing apparatus according to claim 32, further comprising:

a data holder for holding ID information specifying the registered data and time information for designating a deletion time of the registered data, for each data registered by the registration command.

34. The printing apparatus according to claim 32, wherein the registered data is indicative of any one of a font pattern, an overlay pattern, a symbol set, and a fill-pattern.

35. A control method for controlling a printing apparatus having a plurality of interpreting functions corresponding to a data command, said method comprising the steps of:

determining one of the plurality of interpreting functions corresponding to a data command, and controlling registration of data based on a registration command transmitted from an external device, and deletion of the registered data based on a deletion command transmitted from the external device, wherein the registration command comprises data used for generating a print pattern and time information for designating a deletion time of the registered data; and wherein the step of controlling deletion of the registered data comprises the step of:

deleting data registered by the registration command at the deletion time designated by the time information included in the registration command.

36. A storage medium storing a program for controlling a printing apparatus having a plurality of interpreting functions corresponding to a data command, said program controlling the printing apparatus to perform the steps of:

determining one of the plurality of interpreting functions corresponding to a data command, and controlling registration of data based on a registration command transmitted from an external device, and deletion of the registered data based on a deletion command transmitted from the external device, wherein the registration command comprises data used for generating a print pattern and time information for designating a deletion time of the registered data; and wherein the step of controlling deletion of the registered data comprises the step of:

deleting data registered by the registration command at the deletion time designated by the time information included in the registration command.

* * * * *

UNITED STATES PATENT AND TRADEMARK OFFICE
CERTIFICATE OF CORRECTION

PATENT NO. : 6,459,497 B1
DATED : October 1, 2002
INVENTOR(S) : Masami Kashiwazaki It is certified that error appears in the above-identified patent and that said Letters Patent is hereby corrected as shown below:

<u>Title page,</u>
Item [56], References Cited, U.S. PATENT DOCUMENTS,
"Sasaki et al." should read -- Sasaki --.

<u>Column 2,</u>
Line 53, "the procedure in Fig. 7, however," should be deleted; and
Lines 54-67 should be deleted.

<u>Column 3,</u>
Lines 1-31 should be deleted.

<u>Column 6,</u>
Line 66, "enables" should read -- enabling --.

<u>Column 8,</u>
Line 20, "exists" should read -- exist --.

<u>Column 10,</u>
Line 9, "followings" should read -- following --.

<u>Column 11,</u>
Line 23, "followings" should read -- following --.

<u>Column 12,</u>
Line 57, "a fixed" should read -- fixed --; and
Line 67, "with of" should read

```
--          with the procedure in Fig. 7, however, difference is that
            when a predetermined period (designated by the
            registered-matter automatic deletion time designation
            command) has elapsed since a command instructing
 5          deletion (registered-matter automatic deletion control
            command) was received, actual deletion processing at
            step S72 and the subsequent steps is started.  Various
            settings can be made, as the conditions(s) of deletion
            at step S75, by the following emulation commands used
10          upon registrated-matter automatic deletion:
            5.1     Registered-matter automatic-deletion execution
                    time designation command
                    ESC*d#T     (# = registered-matter automatic deletion
                                        execution time;
15                              Ex.:    deleted after one day, 18 hours
                                        and 24 minutes has passed
                                        →01:18:24)
```

UNITED STATES PATENT AND TRADEMARK OFFICE
CERTIFICATE OF CORRECTION

PATENT NO. : 6,459,497 B1
DATED : October 1, 2002
INVENTOR(S) : Masami Kashiwazaki It is certified that error appears in the above-identified patent and that said Letters Patent is hereby corrected as shown below:

Column 12,
Line 67 cont'd,

```
        5.2    Registered-matter automatic deletion number-of-
               use designation command
20             ESC*d#H    (# = number of use: registered matter(s)
                           having this value or less is deleted)
        5.3    Registered-matter automatic deletion control
               command
               ESC*d#A    (# = 0: not perform automatic deletion
25                           1: at a time where a predetermined
                                period has passed from
                                registration, automatically
                             delete registered matter(s)
                          having number of uses(s) of
                          designated value or less
 5                           2: automatically delete registered
                                matter(s) a predetermined period
                                has passed from the last use
                          11, 12; automatically delete registered
                                matter(s) registered by an
10                              emulation command the same as
                                that used in registration of
                                registered matters deleted with
                                # = 1 and 2)
               Note that automatic deletion date and time can
15      be designated by the above-described registered-matter
        automatic deletion date&time designation command 1.2.
               Further, automatic deletion designation by these
        registered-matter automatic deletion designation
        commands is normally made upon registration, however,
20      new automatic deletion setting can be made by
        designating the ID number of a desired registered
        matter by the fill-pattern ID-number designation
        command 1.1 at arbitrary timing and designating any of
        the registered-matter automatic deletion designation
25      commands.
               As described above, upon execution of deletion of
```

UNITED STATES PATENT AND TRADEMARK OFFICE
CERTIFICATE OF CORRECTION

PATENT NO. : 6,459,497 B1
DATED : October 1, 2002
INVENTOR(S) : Masami Kashiwazaki It is certified that error appears in the above-identified patent and that said Letters Patent is hereby corrected as shown below:

Column 13,
Line 24, "is not" should read -- does not --;
Line 35, "program" should read -- programs -- and "be" should read -- be stored in --; and
Line 43, "be also" should read -- also be --.

Column 14,
Line 18, "device, and" should read -- device, and --.

Signed and Sealed this

Twenty-second Day of July, 2003

JAMES E. ROGAN
*Director of the United States Patent and Trademark Office*